United States Patent
Gijzel et al.

[19]

[11] Patent Number: 6,098,525
[45] Date of Patent: Aug. 8, 2000

[54] APPARATUS FOR BREWING BEVERAGES

[75] Inventors: Jacobus M. Gijzel; Marcel H. S. Weijers; Peter Dam, all of Hoogeveen, Netherlands

[73] Assignee: U.S. Philips Corporation, New York, N.Y.

[21] Appl. No.: 09/340,935

[22] Filed: Jun. 28, 1999

[30] Foreign Application Priority Data

Jul. 1, 1998 [EP] European Pat. Off. ............. 98202216

[51] Int. Cl.[7] .................................................. A47J 31/057
[52] U.S. Cl. ........................... 99/282; 99/283; 99/280; 99/307
[58] Field of Search .............................. 99/280, 281, 282, 99/283, 307

[56] References Cited

U.S. PATENT DOCUMENTS 5,044,261  9/1991  Kawazoe ................................. 99/280
5,309,821  5/1994  Kneplar ................................... 99/282

FOREIGN PATENT DOCUMENTS 08024132A  1/1996  Japan.

Primary Examiner—Reginald L. Alexander
Attorney, Agent, or Firm—Ernestine C. Bartlett

[57] ABSTRACT

An apparatus for brewing hot beverages, such as coffee, comprising a water reservoir, a heating element for heating water in the water reservoir, an extraction device, an electric pump and a thermostat for the detection of the temperature of the water in the reservoir. The thermostat is connected in series with the heating element and the pump is connected in parallel with the thermostat. After the water has reached the desired temperature the thermostat is closed, which causes the pump to be switched on in order to pump the hot water to the extraction device. During the pumping phase the power of the heating element is virtually cut off.

7 Claims, 1 Drawing Sheet

APPARATUS FOR BREWING BEVERAGES

BACKGROUND OF THE INVENTION

The invention relates to an apparatus for brewing hot beverages, comprising a water reservoir, a heating element for heating the water in the water reservoir, an extraction device, an electric pump for pumping water to the extraction device, a thermostat for detecting the temperature of the water in the water reservoir, the water being pumped to the extraction device after the water in the water reservoir has reached a given preset temperature.

Such an apparatus, intended for brewing coffee, is known from JP-A-08024132. In said apparatus water is pumped from a water reservoir through a pipe system, is heated in the pipe system and is pumped back into the water reservoir. When the water in the water reservoir has reached a given temperature a valve in the pipe system opens and hot water is pumped to an extraction device in order to obtain a coffee brew. A disadvantage of this construction is that the water in the water reservoir is heated by first pumping the water from the water reservoir into a pipe system, heating it, and then feeding it back into the water reservoir. During the coffee brewing process the pump must be constantly switched on. Moreover, a two-way valve is needed to pump the hot water to the extraction device.

SUMMARY OF THE INVENTION

It is an object of the invention to improve the apparatus of the type defined in the opening paragraph in such a way that by means of a simple construction a rapid brewing or extraction process is achieved, which yields a brew, such as coffee, tea or soup, of satisfactory flavor.

To this end, the apparatus in accordance with this invention is characterized in that the thermostat is arranged in series with the heating element and the pump is arranged in parallel with the thermostat.
The pump is not switched on, in order to pump the hot water to the extraction device, until the water in the water reservoir has reached the desired temperature. Since the internal resistance of a customary pump motor is always high with respect to the resistance of the heating element and the pump is arranged in parallel with the thermostat, switching on of the pump will cause the power to the heating element to be virtually cut off. A pipe system and a valve as in the afore-mentioned Patent Application JP-A-08024132 are not necessary.

A preferred embodiment of the apparatus in accordance with the invention is characterized in that the apparatus further comprises another, second heating element for heating the water in the water reservoir, which second heating element is arranged in parallel with the series arrangement of the first heating element and of the parallel arrangement of the pump and the thermostat. The second heating element contributes to an increase of the power, as a result of which the water in the water reservoir is heated rapidly to the desired temperature. However, the second heating element remains switched on after starting of the pump, in order to ensure that the water in the water reservoir remains at the desired temperature.

Another preferred embodiment of the apparatus in accordance with the invention is characterized in that the power of the second heating element is smaller than the power of the first heating element. The power of the second heating element should be selected in such a manner that it is high enough to maintain the maximum amount of water in the water reservoir at the desired temperature. The power of the first heating element may be as high as permissible (obviously in compliance with the prevailing safety standards). This merely speeds up the heating process.

A further embodiment of the apparatus in accordance with the invention is characterized in that the thermostat is a thermostat which is responsive to steam. For the present field of use such a thermostat is more reliable than a regular thermostat having a sensor which measures the temperature directly.

Yet another embodiment of the apparatus is characterized in that a second thermostat has been provided which turns off both heating elements and the pump after the water has been pumped out of the water reservoir. After the coffee-brewing process the pump and the second heating element may be turned off. This is effected automatically by means of this second thermostat. At option, a heating element arranged in parallel with the second thermostat may be provided in order to ensure that the second thermostat remains active, i.e. that the pump and the heating elements remain switched off.

Still another embodiment of the apparatus in accordance with the invention is characterized in that the coffee-making apparatus has a detection switch for detecting the presence of a coffee receptacle underneath the extraction device, which detection switch turns off the pump when the coffee receptacle is not situated underneath the extraction device.

BRIEF DESCRIPTION OF THE DRAWINGS

The invention will be described in more detail with reference to a drawing which shows an embodiment given by way of example. In the drawing FIG. 1 diagrammatically shows a coffee-making apparatus in accordance with the invention.

DESCRIPTION OF THE PREFERRED EMBODIMENTS

Figure 1:
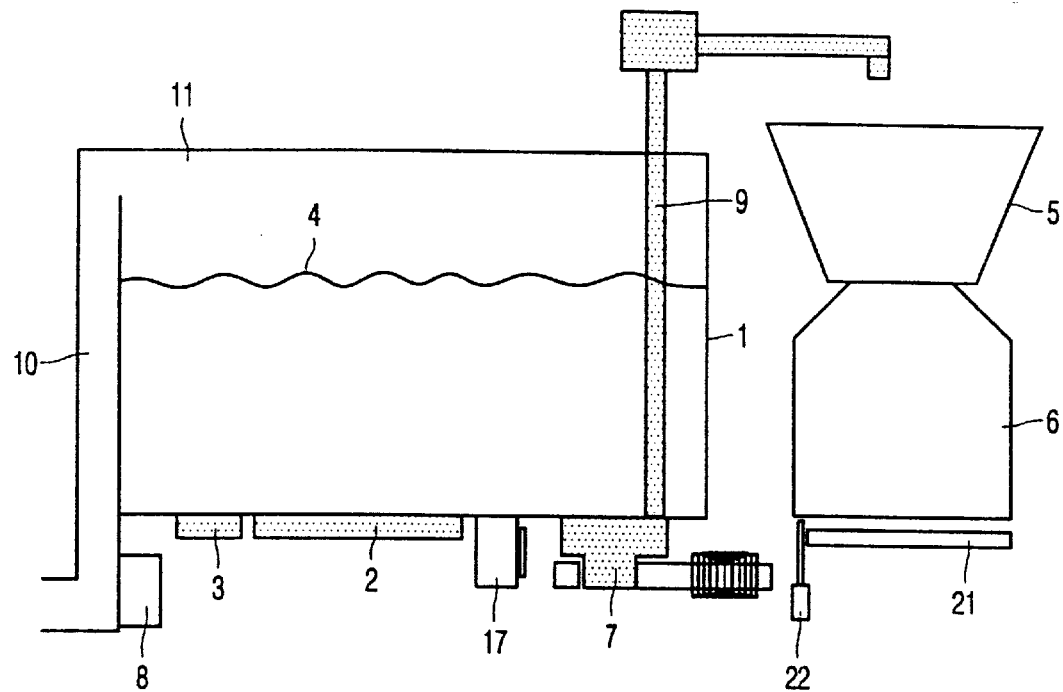

The coffee-making apparatus shown in FIG. 1 comprises a water reservoir 1, a heating element 2 for heating water 4 in the water reservoir, an extraction device 5, a coffee receptacle 6 for receiving coffee brew discharged from the extraction device, an electric pump 7 for pumping hot water from the water reservoir to the extraction device, and a thermostat 8 for detecting the temperature of the water in the water reservoir. The coffee-making apparatus may also have a second heating element 3 for heating the water in the water reservoir 1. Preferably, the first heating element then has a high power, for example 1900 W, and the second heating element a low power, for example 300 W. The heating elements are mounted against the bottom of the water reservoir and are shown diagrammatically adjacent one another in FIG. 1. The pump 7 can be, for example, a centrifugal pump situated underneath the bottom of the water reservoir. The pump pumps the water from the water reservoir to the extraction device 5 via a pipe 9. If the thermostat 8 is a thermostat which is responsive to steam it is arranged in a steam duct 10 which communicates with the space 11 of the water reservoir situated above the maximum water level. When the water in the water reservoir boils the steam flows through the duct past the thermostat, which provides an electrical switching function.

Figure 2:
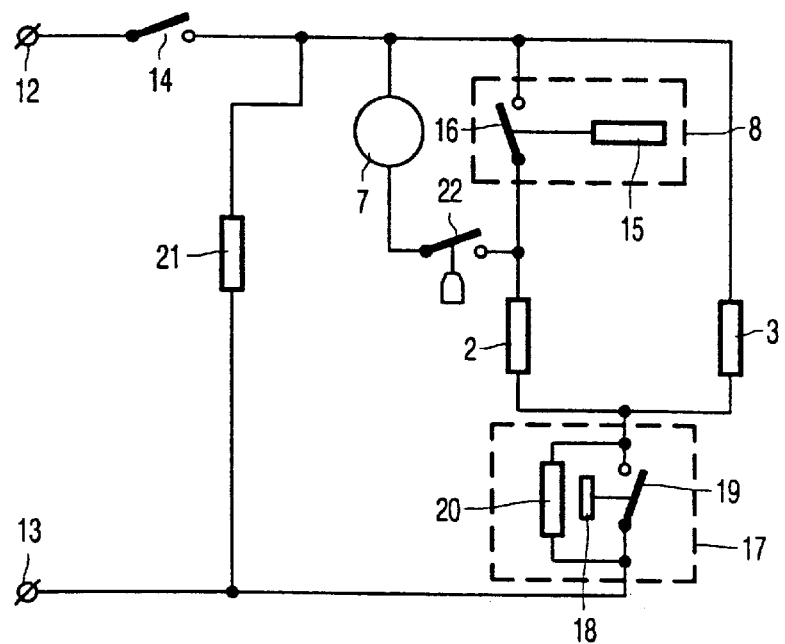
FIG. 2 is an electrical circuit diagram of the coffee-making apparatus shown in FIG. 1.

FIG. 2 shows an electrical circuit diagram for the coffee-making apparatus of FIG. 1. The circuit has a first supply voltage terminal 12 and a second supply voltage terminal 13, one of these terminals being connected via a main switch 14 to turn on and turn off the coffee-making apparatus, and includes the first and the second heating element 2 and 3, the pump 7 and the thermostat 8. The thermostat has a sensor 15 which is responsive to steam and which operates a switch 16. The first heating element 2 is arranged in series with the switch 16, while the pump 7 is arranged in parallel with the switch 16. The series arrangement of the first heating element 2 and the thermostat switch 16, on the one hand, and the second heating element 3, on the other hand, are arranged in parallel with the supply voltage terminals 12 and 13.

The coffee-making apparatus operates as follows: the water reservoir is filled with water and the main switch 14 is closed. The thermostat switch 16 is closed (there is no steam generation), as a result of which the pump 7 is short-circuited. Both heating elements 2, 3 are now switched on to heat the water as rapidly as possible to boiling temperature. As soon as the water begins to boil, the steam thus produced flows through the steam duct 10 past the sensor 15 of the thermostat 8 and the switch 16 is opened. The pump 7 is now arranged in series with the first heating element 2. Since the resistance of the first heating element is substantially lower than the internal resistance of the pump, the pump will operate substantially at full power, the heat produced in the first heating element being substantially zero. The second heating element 3 remains energized to keep the water boiling or at the desired temperature. The pump pumps all the hot water to the extraction device 5 via the pipe 9, which extraction device is filled with ground coffee. The coffee brew is received in the coffee receptacle 6. After all the water has been pumped out of the water reservoir the pump 7 and the heating elements 2, 3 can be switched off. This can be effected by providing the coffee-making apparatus with a second thermostat 17, whose sensor 18 is in thermal contact with the bottom of the water reservoir and operates a switch 19. At option, an additional heating element 20, for example a PTC element, may be arranged in parallel with this second thermostat in order to ensure that the switch of this thermostat remains open. Instead of this heating element 20 it is possible to use a thermostat which directly detects the temperature of the heating element 2.

The coffee-making apparatus may further be provided with a heating element 21 for keeping the coffee brew in the coffee receptacle warm. In order to prevent the pump 7 from being activated without the coffee receptacle being situated underneath the extraction device 5, the coffee-making apparatus may also be provided with a detection switch 22 arranged in series with the pump. The detection switch is closed and the pump can function only if the coffee receptacle has been placed correctly underneath the extraction device.

As stated hereinbefore, the second heating element 3 is optional. The main reason to include this element in the system is to ensure that the water remains at the correct temperature during the pumping phase.

It is obvious that, instead of a thermostat which is responsive to steam, it is possible to use a regular thermostat which directly detects the water temperature. Such a thermostat may then also serve to detect an empty water reservoir, instead of the thermostat 17. The heating elements as employed in most coffee-makers but it is alternatively possible to use thick-film elements.

What is claimed is:

1. An apparatus for brewing hot beverages, comprising a water reservoir, a heating element for heating the water in the water reservoir, an extraction device, an electric pump for pumping water to the extraction device, a thermostat for detecting the temperature of the water in the water reservoir, the water being pumped to the extraction device after the water in the water reservoir has reached a given preset temperature, wherein the thermostat is arranged in series with the heating element and the pump is arranged in parallel with the thermostat.

2. An apparatus as claimed in claim 1, wherein the apparatus further comprises another, second heating element for heating the water in the water reservoir, which second heating element is arranged in parallel with the series arrangement of the first heating element and with the parallel arrangement of the pump and the thermostat.

3. An apparatus as claimed in claim 2, wherein the power of the second heating element is lower than the power of the first heating element.

4. An apparatus as claimed in claim 1, wherein the thermostat is a thermostat which is responsive to steam.

5. An apparatus as claimed in claim 1, wherein a second thermostat has been provided, which turns off both heating elements and the pump after the water has been pumped out of the water reservoir.

6. An apparatus as claimed in claim 5, wherein a heating element is arranged in parallel with the second thermostat.

7. An apparatus as claimed in claim 1, wherein the coffee-making apparatus has a detection switch for detecting the presence of a coffee receptacle underneath the extraction device, which detection switch turns off the pump when the coffee receptacle is not situated underneath the extraction device.

* * * * *